2,705,680
Patented Apr. 5, 1955

2,705,680

WATER-PROOF PROTEINOUS ADHESIVES

Reino Alexander Jarvi, Seattle, Wash., assignor to Monsanto Chemical Company, St. Louis, Mo., a corporation of Delaware No Drawing. Application October 18, 1951,
Serial No. 251,983

19 Claims. (Cl. 106—146)

This invention relates to new compositions of matter, to water-proof proteinous adhesives obtained therefrom and the preparation thereof. More particularly it relates to a proteinous substance containing therein an alkylene trithiocarbonate and the water-proof proteinous adhesive compositions obtained therefrom.

In the manufacture of water-proof proteinous adhesive compositions it has been customary to employ carbon disulfide. Although carbon disulfide is highly effective for water-proofing purposes it has many disadvantages. For example, it is a highly volatile, foul smelling liquid whose vapors are toxic and highly inflammable. Further, carbon disulfide cannot be incorporated directly in a dry proteinous adhesive base mix. In actual practice carbon disulfide is added to an aqueous or wet proteinous adhesive composition and such is performed by the adhesive user rather than the adhesive manufacturer. This not only is a difficult and hazardous task, but often results in the formation of a non-homogeneous composition. Furthermore, many locales strictly regulate the storage and use of carbon disulfide. Accordingly the art has sought a suitable replacement for carbon disulfide.

In accordance with this invention it has been found that the aforementioned disadvantages in the manufacture of water-proof proteinous adhesive compositions are substantially overcome by the employment of an alkylene trithiocarbonate of the general formula

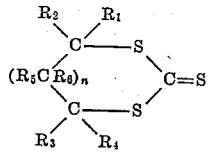

where $R_1$, $R_2$, $R_3$, $R_4$, $R_5$ and $R_6$ are like or unlike substituents selected from the group consisting of hydrogen atoms and alkyl radicals such as methyl, ethyl, n-propyl, isopropyl, n-butyl, isobutyl, n-amyl, isoamyl, sec. amyl, and the like, and where $n$ is an integer. The water-proof proteinous adhesive compositions obtained from a proteinous material admixed with a small amount of an alkylene trithiocarbonate fully satisfy the rigid requirements of plywood making.

The new water-proofing agents of this invention are stable, non-volatile, relatively non-inflammable substances which can be incorporated directly in a dry proteinous adhesive base mix by the adhesive manufacturer. Furthermore, the new water-proofing agents of this invention do not impart an objectionable odor to the proteinous adhesive composition nor do they affect the flow properties of the proteinous material per se. In addition to their water-proofing characteristics the alkylene trithiocarbonates of this invention function as antifoaming agents. Although the new water-proofing agents may be incorporated directly in a dry proteinous adhesive base mix in certain instances it has been found convenient to dissolve or disperse the alkylene trithiocarbonate in a small amount of an inert organic liquid such as pine oil, diesel oil, liquid aliphatic hydrocarbons such as pale oil, aromatic hydrocarbons such as toluene, xylene, durene, cumene, etc., and incorporate the solution or dispersion so formed in the dry base mix. The organic liquid so employed is added in amounts less than 5% by weight based upon the proteinous material, which amounts are insufficient to make the mixture damp, and, thus, the mix retains the flow characteristics of the original proteinous material.

The preferred alkylene trithiocarbonates of this invention are those of the aforenoted general formula wherein $n$ is 0, and of this group ethylene trithiocarbonate (M. P. 39.5° C.) is particularly preferred. As illustrative of other operable alkylene trithiocarbonates are:

4-methyl-ethylene trithiocarbonate
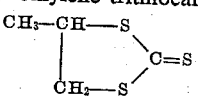

4-ethyl-ethylene trithiocarbonate
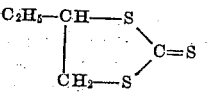

4,5-dimethyl-ethylene trithiocarbonate
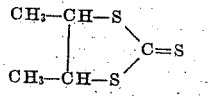

4-n-butyl-ethylene trithiocarbonate
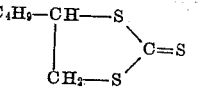

4,4-dimethyl-ethylene trithiocarbonate
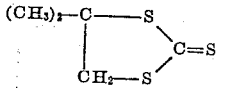

4,4,5,5-tetramethyl-ethylene trithiocarbonate
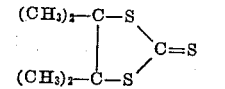

propylene trithiocarbonate
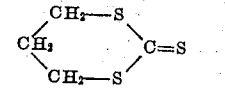

5-methyl-propylene trithiocarbonate
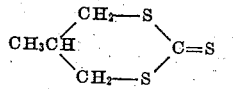

5,5-dimethyl-propylene trithiocarbonate
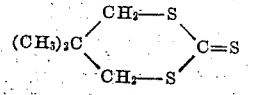

By "water-proof" is not meant that the adhesive composition so characterized will resist the action of water indefinitely, but it is meant that the adhesives are water-proof in the sense in which the term is used in the plywood industry, that is, that a 3-ply panel can be soaked in cold water 48 hours, or in boiling water for 8 hours, without separation.

By "proteinous materials" is meant, unless otherwise modified, to include proteins of animal and vegetable origin and mixtures thereof which are alkali soluble. By "vegetable proteinous material" is meant to include flours of such oleaginous seeds as soybean, peanut, cottonseed, linseed, sesame seed, castor beans, sunflower seed, safflower seed, and the like. By "animal proteinous material" is meant to include not only milk casein and hide and bone glue but also blood albumin, gelatine, fish glue, egg albumin and the like. Although the new water-proofing agents of this invention greatly increase the strength and water-resistance of proteinous adhesive compositions wherein the proteinous material is either of animal or vegetable origin they exhibit the same properties in adhesive compositions embodying a mixture of vegetable proteinous material and animal proteinous material.

The following is illustrative of this invention:

*Example*

A dry powdered adhesive base mix is prepared in a suitable mixing device by mixing directly 965 parts by weight soybean flour, 10 parts by weight ethylene trithiocarbonate (M. P. 39.5° C.), 10 parts by weight pine oil, and 15 parts by weight diesel oil. The dry adhesive base mix so obtained is of a straw yellow color, exhibits the flow properties of the soybean flour per se, and is characterized by excellent storage properties.

This thoroughly mixed homogenous dry adhesive base mix can be commercially marketed and sold in sacks with directions to the user to incorporate water and other additives ordinarily employed in the preparation of proteinous adhesive compositions.

To illustrate the increased strength and water-resistance of proteinous base adhesives containing an alkylene trithiocarbonate of this invention, 100 parts by weight of the above described dry powdered proteinous adhesive base mix is placed in a suitable mixing device and thereto is added and intimately mixed a wet mix containing 342 parts by weight water, 12 parts by weight of calcium hydroxide, 8 parts by weight of sodium hydroxide, and 25 parts by weight of commercial sodium silicate (Philadelphia Quartz Co. "N" Brand). This adhesive composition, identified as A is compared to an identical composition prepared in the same manner with the exception that ethylene trithiocarbonate is omitted. The latter adhesive composition is identified as B.

Adhesives A and B are used to make up 3-ply fir panels. These panels are stored five days and test pieces cut from them to determine dry tensile strength in a standard plywood testing machine. Also test pieces are placed to soak in water for 48 hours and then tested on the same machine. The following are the average results of two experiments in pounds per square inch:

| Adhesive | Dry Strength | Strength After Soaking 48 Hours |
|---|---|---|
| A | 249 | 142 |
| B | 194.5 | 127.5 |

Improved strength and water-resistance is noted in similar adhesive formulae when an alkylene trithiocarbonate of this invention is incorporated with other proteinous materials of either vegetable or animal origin.

In the above example instead of sodium hydroxide other alkali metal hydroxides, e. g. potassium hydroxide, lithium hydroxide, or ammonia may be employed. Other alkaline earth metal hydroxides than that of calcium may be used, for example, magnesium hydroxide, strontium hydroxide and barium hydroxide. Other alkaline materials in addition to sodium hydroxide and/or in place of calcium hydroxide such as the alkali metal carbonates, the alkali metal silicates, the alkali metal fluorides, the alkali metal sulfites, the alkali metal phosphates, the alkaline earth metal phosphates, borax, and similar salts of a strong base and a weak acid whose aqueous solutions possess a pH in excess of 7, which salts are well known to those in the art, may be employed for dispersing or solubilizing the proteinous material in an aqueous medium. The amount of sodium hydroxide or other alkali metal hydroxide employed is ordinarily limited to 3 to 17% by weight based upon the proteinous material, however, where desired amounts outside this range may be used. The limiting amount of sodium hydroxide ordinarily is that amount sufficient to control the tendency of the finished adhesive to thicken on standing. Ordinarily the amount of calcium hydroxide employed is 6–12 parts per 100 parts of proteinous material, however, where desirable amounts outside this range may be used.

The following is further illustrative of successful dry adhesive base mix formulae:

Parts by weight

I. Cottonseed flour _____ 48
Soybean flour _____ 48
Diesel oil _____ 2
Pine oil _____ 1
Ethylene trithiocarbonate _____ 1

II. Safflower flour _____ 96
Commercial mixture of high boiling benzene derivatives _____ 2
Pine oil _____ 1
Ethylene trithiocarbonate _____ 1

III. Peanut flour _____ 90
Soda ash _____ 2
Tricalcium phosphate _____ 2
Commercial mixture of high boiling benzene derivatives _____ 2
Sodium fluoride _____ 1
Pine oil _____ 1
Ethylene trithiocarbonate _____ 2

By admixing 100 parts by weight of any one of the above dry proteinous adhesive base mixes in a suitable mixing device with 10 parts by weight of calcium hydroxide, 9 parts by weight sodium hydroxide, 25 parts by weight of commercial sodium silicate, and 200 to 400 parts by weight of water, a highly satisfactory waterproof glue is obtained.

Although it is preferable to dry mix the proteinous material with the alkylene trithiocarbonate and subsequently incorporate the alkaline material and water, in some instances it has been found convenient to dry mix the proteinous material, the alkylene trithiocarbonate, and the alkaline materials and subsequently add water to make the finished adhesive. As illustrative of the latter type dry base mixes are the following:

Parts by weight

IV. Lactic casein _____ 59.0
Clay _____ 16.0
Hydrated lime _____ 9.4
Trisodium phosphate _____ 3.6
Sodium fluoride _____ 3.4
Sodium sulfite _____ 2.6
Pine oil _____ 2.5
Pale oil _____ 2.5
Ethylene trithiocarbonate _____ 1.0

V. Lactic casein _____ 59.0
Clay _____ 16.0
Hydrated lime _____ 9.4
Trisodium phosphate _____ 3.6
Sodium fluoride _____ 3.4
Sodium sulfite _____ 2.6
Pine oil _____ 2.5
Pale oil _____ 2.5
4-methyl-ethylene trithiocarbonate _____ 1.0

By admixing 100 parts by weight of either of the above dry adhesive base mixes in a suitable mixing device with about 250 parts by weight of water a satisfactory waterproof glue is obtained.

It is to be understood that the particular order in which the several ingredients are admixed together in the aforedescribed adhesive formulae may be varied and further it is to be understood that the manufacture of the product need not be completed in a single continuous operation. As a matter of practice it has been found desirable to mix only certain of the ingredients initially and then add the others just before the adhesive is required for use. Thus, at least the proteinous material and the alkylene trithiocarbonate are mixed dry and in this form shipped to the user, e. g., a plywood plant. There the dry composite is admixed with at least water to make the finished adhesive.

Although it is preferred to dry mix the proteinous material and the alkylene trithiocarbonate and supply such to an adhesive user with directions for him to add water thereto, this invention contemplates the incorporation of an alkylene trithiocarbonate in a wet or aqueous mix of the proteinous adhesive material in the presence or absence of alkaline materials ordinarily employed in the manufacture of proteinous adhesive compositions.

Although this invention has been described in respect to certain mixing procedures and the employment of certain components, variations thereof which are well known to those skilled in the art are within the scope of this invention. Ordinarily about 1% of an alkylene trithiocarbonate of this invention based upon the weight of the proteinous material is sufficient to develop the desired water-proofing properties. However, amounts from 0.5 to 5% may be used where desired.

In addition to the formation of improved proteinous adhesives the alkylene trithiocarbonates, e. g. ethylene trithiocarbonate, are useful in improving the scrub-resistance properties of casein base paints.

What is claimed is:

1. A composition of matter comprising a proteinous material and an alkylene trithiocarbonate of the general formula

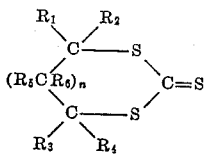

where $R_1$, $R_2$, $R_3$, $R_4$, $R_5$, and $R_6$ are selected from the group consisting of hydrogen and lower alkyl groups, and where $n$ is an integer selected from the group consisting of zero and one, said alkylene trithiocarbonate being present in an amount sufficient to waterproof the proteinous material.

2. A composition of matter comprising a proteinous material and about 0.1 to 5% by weight based upon the proteinous material of an alkylene trithiocarbonate of the general formula

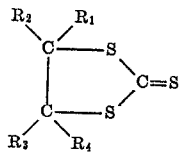

where $R_1$, $R_2$, $R_3$ and $R_4$ are alkyl groups containing 1 to 5 carbon atoms.

3. A composition of matter comprising a proteinous material and about 0.1 to 5% by weight based upon the proteinous material of an alkylene trithiocarbonate of the general formula

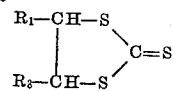

where $R_1$ and $R_3$ are alkyl groups containing 1 to 5 carbon atoms.

4. A composition of matter comprising a proteinous material, an alkaline material, and about 0.1 to 5% by weight based upon the proteinous material of an alkylene trithiocarbonate of the general formula

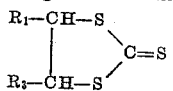

where $R_1$ and $R_3$ are alkyl groups containing 1 to 5 carbon atoms.

5. A composition of matter comprising a vegetable proteinous material and about 0.1 to 5% by weight based upon the proteinous material of ethylene trithiocarbonate.

6. A composition of matter comprising an animal proteinous material, an alkaline material and about 0.1 to 5% by weight based upon the proteinous material of ethylene trithiocarbonate.

7. A composition of matter for adhesive manufacture comprising a proteinous material, sodium hydroxide and about 0.1 to 5% by weight based upon the proteinous material of ethylene trithiocarbonate.

8. In the process of manufacturing a water-proof adhesive composition the step which comprises admixing a proteinous material with a water-proofing amount of an alkylene trithiocarbonate of the formula

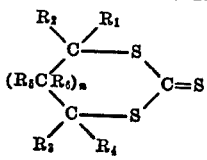

where $R_1$, $R_2$, $R_3$, $R_4$, $R_5$, and $R_6$ are selected from the group consisting of hydrogen and lower alkyl groups, and where $n$ is an integer selected from the group consisting of zero and one.

9. In the process of manufacturing a water-proof adhesive composition the step which comprises admixing a proteinous material with about 0.1 to 5% by weight based upon the proteinous material of an alkylene trithiocarbonate of the formula

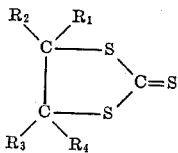

where $R_1$, $R_2$, $R_3$ and $R_4$ are alkyl groups containing 1 to 5 carbon atoms.

10. In the process of manufacturing a water-proof adhesive composition the step which comprises admixing a proteinous material with about 0.1 to 5% by weight based upon the proteinous material of an alkylene trithiocarbonate of the formula

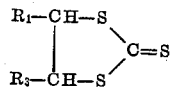

where $R_1$ and $R_3$ are alkyl groups containing 1 to 5 carbon atoms.

11. In the process of manufacturing a water-proof adhesive composition the step which comprises admixing a proteinous material with about 0.1 to 5% by weight based upon the proteinous material of ethylene trithiocarbonate.

12. In the process of manufacturing a water-proof adhesive composition the step which comprises admixing a proteinous material with about 0.1 to 5% by weight based upon the proteinous material of an alkaline material and ethylene trithiocarbonate.

13. An adhesive base mix comprising soybean flour and about 0.1 to 5% by weight based upon the soybean flour of ethylene trithiocarbonate.

14. An aqueous adhesive composition comprising the reaction product of soybean flour, sodium hydroxide, and about 0.1 to 5% by weight based upon the soybean flour of ethylene trithiocarbonate.

15. An adhesive base mix comprising casein flour and about 0.1 to 5% by weight based upon the casein flour of ethylene trithiocarbonate.

16. An aqueous adhesive composition comprising the reaction product of casein flour, sodium hydroxide, and about 0.1 to 5% by weight based upon the casein flour of ethylene trithiocarbonate.

17. An adhesive base mix comprising soybean flour and about 1% by weight based upon the soybean flour of ethylene trithiocarbonate.

18. An adhesive base mix comprising casein flour and about 1% by weight based upon the casein flour of ethylene trithiocarbonate.

19. An adhesive base mix comprising casein flour and about 1% by weight based upon the casein flour of 4-methylethylene trithiocarbonate.

References Cited in the file of this patent

UNITED STATES PATENTS

| | | |
|---|---|---|
| 2,167,752 | Harford | Aug. 1, 1939 |
| 2,412,327 | Eilerman | Dec. 10, 1946 |
| 2,621,143 | Goodhue et al. | Dec. 9, 1952 |

OTHER REFERENCES

The Technology of Adhesives, Del Monte, Reinhold Pub. Co., New York, New York, 1947. Pages 263–264.